(12) United States Patent
Nakhijiri (10) Patent No.: US 9,053,332 B2
(45) Date of Patent: Jun. 9, 2015

(54) POLICY FOR SECURE PACKET TRANSMISSION USING REQUIRED NODE PATHS AND CRYPTOGRAPHIC SIGNATURES

(71) Applicant: Google Technology Holdings LLC, Mountain View, CA (US)

(72) Inventor: Madjid F. Nakhijiri, San Diego, CA (US)

(73) Assignee: GOOGLE TECHNOLOGY HOLDINGS LLC, Mountain View, CA (US)

(*) Notice: Subject to any disclaimer, the term of this patent is extended or adjusted under 35 U.S.C. 154(b) by 177 days.

(21) Appl. No.: 13/786,980

(22) Filed: Mar. 6, 2013

(65) Prior Publication Data

US 2013/0239169 A1 Sep. 12, 2013

Related U.S. Application Data

(60) Provisional application No. 61/607,625, filed on Mar. 7, 2012.

(51) Int. Cl.
| | |
|---|---|
| *G06F 17/00* | (2006.01) |
| *G06F 21/60* | (2013.01) |
| *H04L 9/32* | (2006.01) |
| *H04L 29/06* | (2006.01) |
| *H04L 12/721* | (2013.01) |

(52) U.S. Cl.
CPC .......... *G06F 21/606* (2013.01); *H04L 9/3247* (2013.01); *H04L 63/0464* (2013.01); *H04L 63/0478* (2013.01); *H04L 63/105* (2013.01); *H04L 63/123* (2013.01); *H04L 63/20* (2013.01); *H04L 45/34* (2013.01)

(58) Field of Classification Search
CPC ............................. H01L 63/20; H01L 63/102
USPC ........................................................... 726/1
See application file for complete search history.

(56) References Cited

U.S. PATENT DOCUMENTS

| | | | |
|---|---|---|---|
| 8,214,653 B1* | 7/2012 | Marr et al. .................. | 713/189 |
| 2008/0317002 A1 | 12/2008 | Boppana et al. | |
| 2010/0138539 A1* | 6/2010 | Neville et al. ............... | 709/226 |
| 2010/0192197 A1 | 7/2010 | Nadalin et al. | |

OTHER PUBLICATIONS

Belgaied K; Winiger G: "Generalized Labeled Security Option; draft-belgaied-ipv6-1sopt-00.txt", Internet Engineering Task Force, IETF, Feb. 2001, all pages.

(Continued)

*Primary Examiner* — Anthony Brown
(74) *Attorney, Agent, or Firm* — Fox Rothschild LLP (57) ABSTRACT

Techniques (400, 600, 700) and apparatuses (102, 106, 108, 800) are described that enable a policy for secure packet transmission using required node paths and cryptographic signatures. These techniques and apparatuses enable a secure execution environment (SEE) of a target device to receive trustworthy sensitive data.

32 Claims, 8 Drawing Sheets

(56) References Cited

OTHER PUBLICATIONS

Lin X et al.: "Asprake: An Anonymous Secure Routing Protocol with Authenticated Key Exchange for Wireless Ad Hoc Networks", Proceedings of the 2007 IEEE International Conference on Communications (ICC 2007), Jun. 24-28, 2007, Glasgow, UK, IEEE, Piscataway, NJ, USA, Jun. 2007, pp. 1247-1253.

Patent Cooperation Treaty, International Search Report and Written Opinion of the International Searching Authority for International Application No. PCT/US2013/029397, Jun. 14, 2013, 14 pages.

"Embedded UICC, A high level remote provisioning architecture", GSMA embedded SIM task force: technical stream, Jul. 18-20, 2011, 16 pages.

"Remote Provisioning of Access Credentials", document jointly created by Ericsson, Motorola Mobility and Qualcomm, not published, V28., Sep. 2011, 37 pages.

R. Housley, "Cryptographic Message Syntax (CMS)", IETF RFC 3852, Jul. 2004, 112 pages.

\* cited by examiner

POLICY FOR SECURE PACKET
TRANSMISSION USING REQUIRED NODE
PATHS AND CRYPTOGRAPHIC SIGNATURES

RELATED APPLICATION

This application claims priority to provisional patent application Ser. No. 61/607,625, filed Mar. 7, 2012, to Madjid F. Nakhjiri, entitled "Security Policy Enforcement in Remote Provisioning," which is hereby incorporated by reference in its entirety.

BACKGROUND

Current smart-card technologies are moving towards non-removable embedded smart cards for use in mobile computing devices, such as mobile phones, tablet computers, and automobile navigation systems. Recent examples include embedded Universal Integrated Circuit Cards (eUICC), which are used to host security-sensitive functions. Aside from smart cards, there is also a trend to use trusted environments (TrE) to perform functions similar to functions currently performed by smart cards.

Non-removable, embedded smart cards and trusted environments, however, often need data to be provided to them after being embedded. Because of this, embedded smart cards and trusted environments are provided with sensitive data remotely. Providing sensitive data remotely, however, suffers from various security risks, communication complexities, and accountability uncertainties.

BRIEF DESCRIPTION OF THE DRAWINGS

Techniques and apparatuses enabling a policy for secure packet transmission and verification of that policy are described with reference to the following drawings. The same numbers are used throughout the drawings to reference like features and components.

DETAILED DESCRIPTION

Current techniques for providing sensitive data remotely suffer from various security risks, communication complexities, or accountability uncertainties. This disclosure describes techniques and apparatuses enabling a policy for secure packet transmission using required node paths and cryptographic signatures. By so doing, a secure execution environment (SEE) of a target device may receive sensitive data. These secure execution environments may include the above-noted embedded Universal Integrated Circuit Cards (eUICC), other forms of embedded chips, various trusted environments (TrEs), or even movable or non-embedded cards, such as SIM cards, or any of various devices or entities that may benefit from receiving sensitive data securely.

The following discussion first describes an operating environment, followed by example methods for employing the techniques in the environment, and then proceeds with an example device for employing the techniques.

Example Environment

Figure 1:
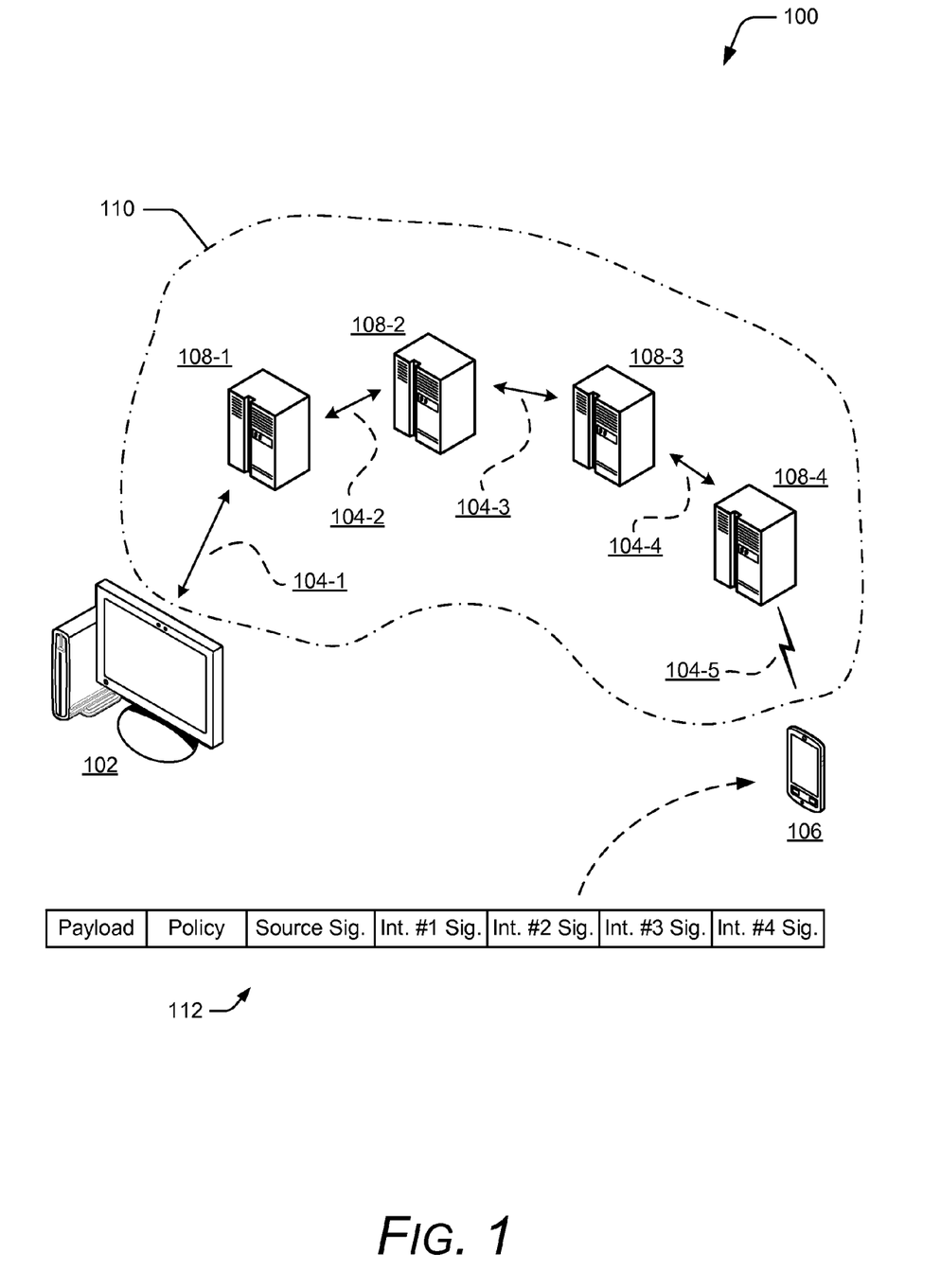
FIG. 1 illustrates an example environment in which techniques enabling a policy for secure packet transmission using required node paths and cryptographic signatures can be embodied.

FIG. 1 illustrates an example environment 100 in which techniques enabling a policy for secure packet transmission using required node paths and cryptographic signatures can be embodied. Environment 100 includes a source node 102, one or more wired and/or wireless communication networks 104, and target device 106. Sensitive data is transmitted through intermediate nodes 108, shown at nodes 108-1, 108-2, 108-3, and 108-4 as part of a required node path 110.

Generally, source node 102 is a source of sensitive data intended for target device 106. In some cases, source node 102 is a mobile network operator in secure communication with a trusted one of the intermediate nodes 108 (e.g., node 108-1), such as a trusted subscription manager capable of end-to-end encryption of a packet having the sensitive data.

Communication networks 104 can include one or multiple communication networks, each shown at networks 104-1, 104-2, 104-3, 104-4, and 104-5, though the term network may be a simple path between nodes or comprise a complex combination of wired and/or wireless communication channels having multiple networks (e.g., cellular, wired, and wireless local area). While not required, network 104-5 is illustrated as a wireless network, as this last hop is often a wireless transmission.

Generally, target device 106 receives a packet transmitted through required node path 110 and having a cryptographic signature for each node of the required node path. Packet 112 illustrates, in a simplified form, this packet having cryptographic signatures from each of intermediate nodes 108 ("Int. #1 Sig." etc.), as well as an end-to-end cryptographic signature (shown as "Source Sig."), which is signed over the payload (e.g., sensitive data), which may also include a policy indicating required node path 110. While each of intermediate nodes 108 may cryptographically sign a packet, a required path node can be verified, in some embodiments, without a signature from those of the intermediate nodes that are trusted.

An indication of a required node path (e.g., a list of identifiers of the intermediate nodes in the required node path, such as an IP address or fully qualified domain name) can be in-the-clear, or otherwise accessible to each node of the required node path. This enables each node to determine to which node the packet should next be sent. The required node path may also be cryptographically inalterable by intermediate nodes to prevent tampering. In some form the required node path is determinable by target device 106 or, in some cases, a trusted intermediate node (e.g., node 108-4). This permits verification that the packet followed exactly the required node path.

Figure 2:
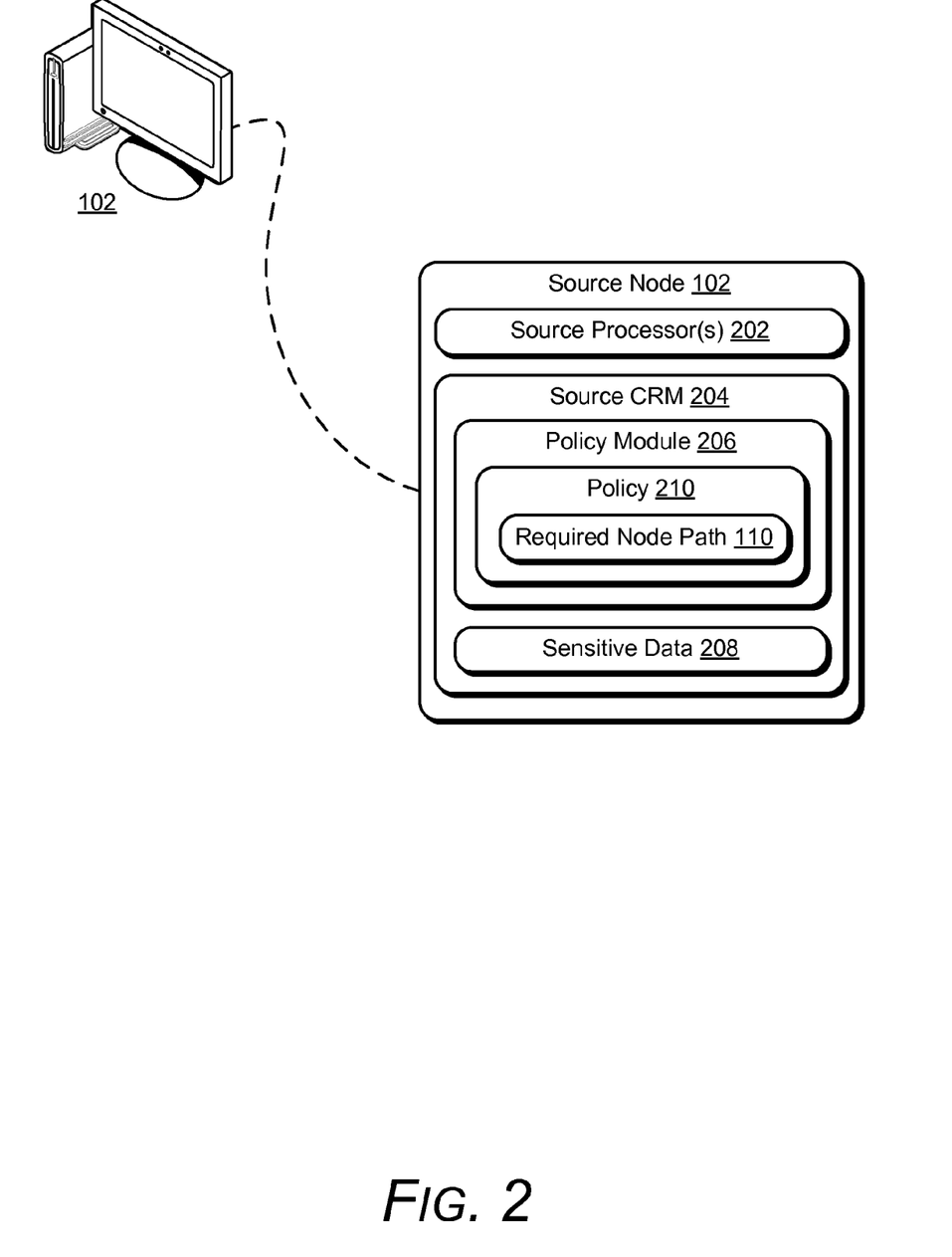
FIG. 2 illustrates the source node of FIG. 1 in detail.

In more detail, see source node 102 as illustrated in FIG. 2. Source node 102 includes or has access to one or more source processors 202 and source computer-readable storage media ("CRM") 204. Source CRM 204 includes a policy module 206 and sensitive data 208. Policy module 206 includes and/or or determines a policy 210 having required node path 110.

Generally, policy module 206 is capable of determining a required node path through an infrastructure through which a packet is intended to be sent to a target device. Policy module 206, alone or acting through a trusted intermediate node, appends a policy to the packet, and cryptographically signs the packet. Policy 210 includes or is appended along with required node path 110 to the packet.

As noted in part above, policy 210 enables target device 106 (or a node trusted by the target device) to determine, based on cryptographic signatures of intermediate nodes 108, that an actual node path of the packet through the infrastructure matches required node path 110. These cryptographic signatures can be of various types that are secure or for which an identity of the signer is verifiable (e.g., the identity of an intermediate node that signed the packet can be verified through the signature).

Policy 210 may also require that each intermediate node confirms an attribute, authorization, or capability, such as a security robustness level. In some embodiments, policy 210 also requires each intermediate node to determine a next intermediate node to send the packet after cryptographically signing the packet. In such a case, required node path 110 is included in an accessible form within the packet (e.g., in a list), though it may also be inalterable (e.g., cryptographically hashed or stored also within policy 210 when cryptographically signed).

Figure 3:
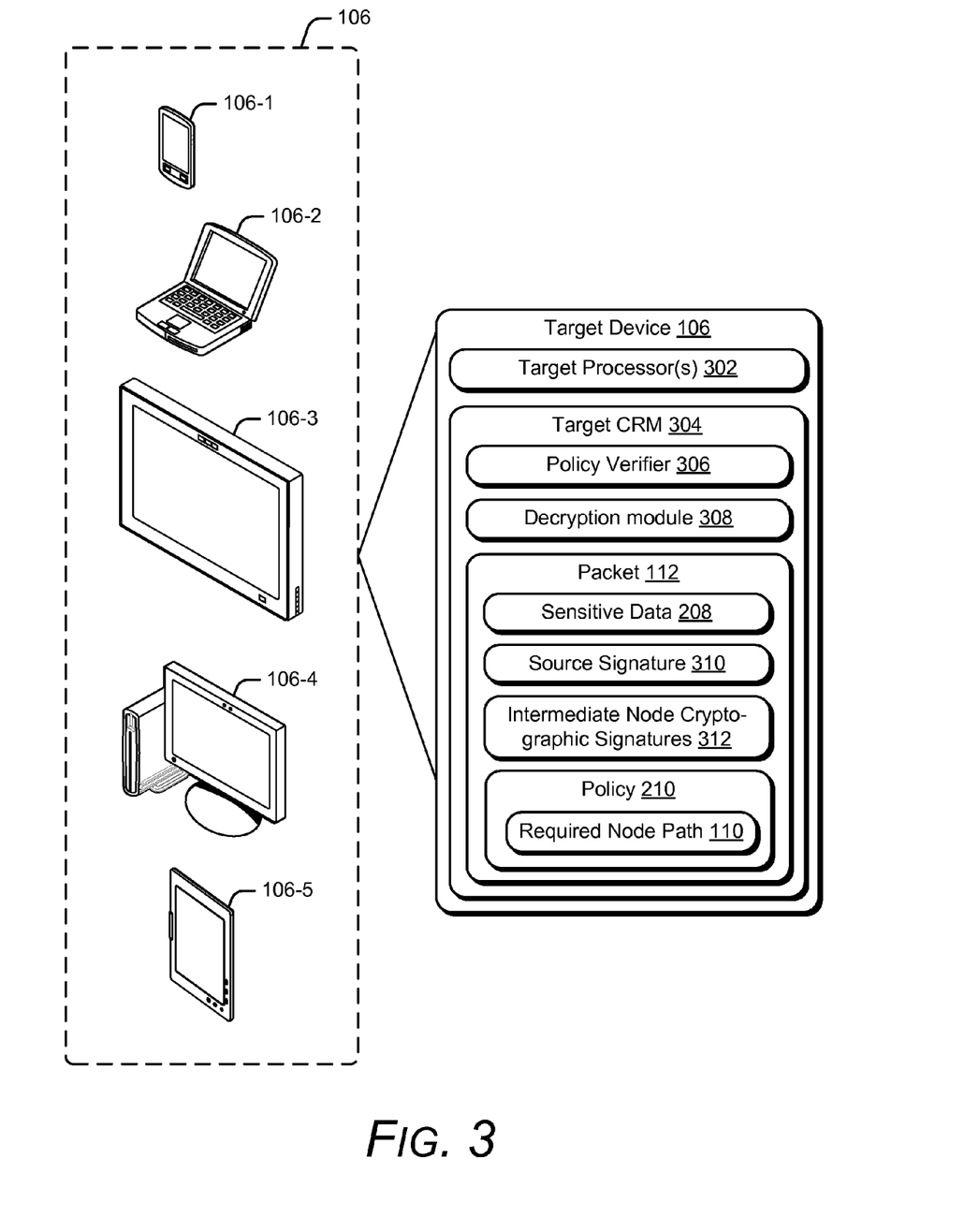
FIG. 3 illustrates the target device of FIG. 1 in detail.

Consider FIG. 3, which illustrates target device 106 in detail. Target device 106 can each be one or a combination of various devices, here illustrated with six examples: a smartphone 106-1, a laptop computer 106-2, a television 106-3, a desktop computer 106-4, and a tablet computer 106-5, though other computing devices and systems, such as netbooks, car navigation systems, and servers may also be used.

Target device 106 includes or has access to (such as through a trusted intermediate node) one or more target processors 302 and target computer-readable storage media ("CRM") 304. Target CRM 304 includes a policy verifier 306, a decryption module 308, and packet 112. Packet 112 includes sensitive data 208, a source signature 310, intermediate node cryptographic signatures 312, policy 210, and required node path 110.

Policy verifier 306 is capable of determining, based on intermediate-node cryptographic signatures 312, an actual path of packet 112 through nodes of the infrastructure. Policy verifier 306 then determines whether the actual node path of the packet matches required node path 110 of packet 112. On verification, policy verifier 306 trusts sensitive data 208. If not verified, however, policy verifier 306 may indicate its determination to a third party, such as to note a failure to verify the path. One or more of the operations performed by target device 106 can be performed, in some embodiments, with an embedded or non-embedded (e.g., a SIM card) device.

Decryption module 308 is capable of decrypting sensitive data 208, though decryption module 308 may forgo doing so if policy verifier 306 determines that the actual node path of packet 112 does not match required node path 110. This document now turns to example methods for performing the techniques, after which an example device is described.

Example Methods

Figure 4:
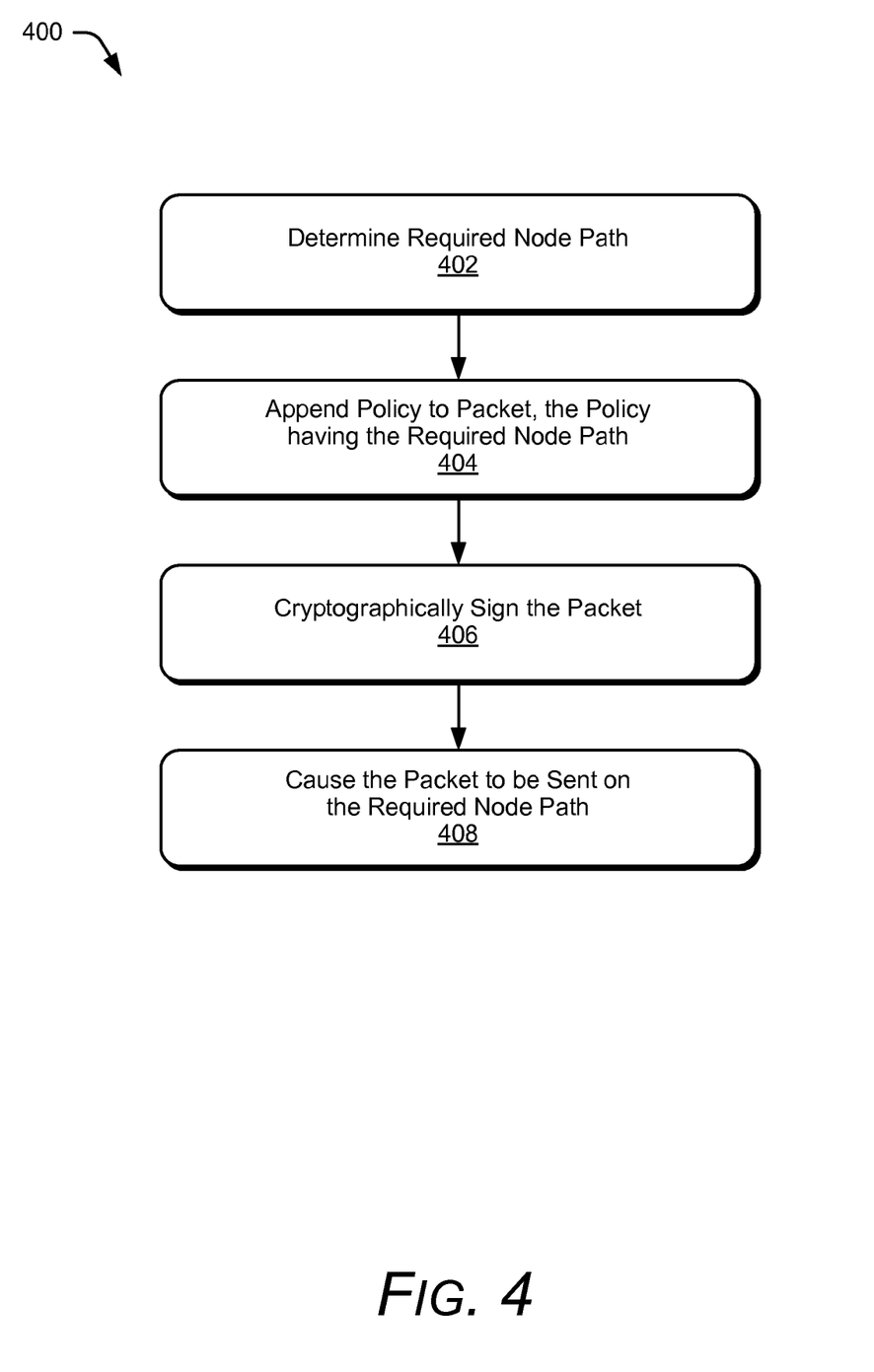
FIG. 4 illustrates example methods for enabling a policy for secure packet transmission using required node paths and cryptographic signatures.

FIG. 4 illustrates example methods 400 enabling a policy for secure packet transmission using required node paths and cryptographic signatures. The order in which blocks of these and other methods are described is not intended to be construed as a limitation, and any number or combination of the described blocks in these and other methods herein can be combined in any order to implement a method or an alternate method.

Block 402 determines a required node path through an infrastructure through which a packet is intended to be sent to a target device, the required node path having one or more intermediate nodes between a source node and the target device. FIG. 1 illustrates intermediate nodes 108 of required node path 110. For visual clarity, however, example environment 100 of FIG. 1 does not show other intermediate nodes of an infrastructure from which intermediate nodes 108 were determined by source node 102. By way of example, consider FIG. 5, which illustrates 28 potential intermediate nodes 502 of infrastructure 504.

Figure 5:
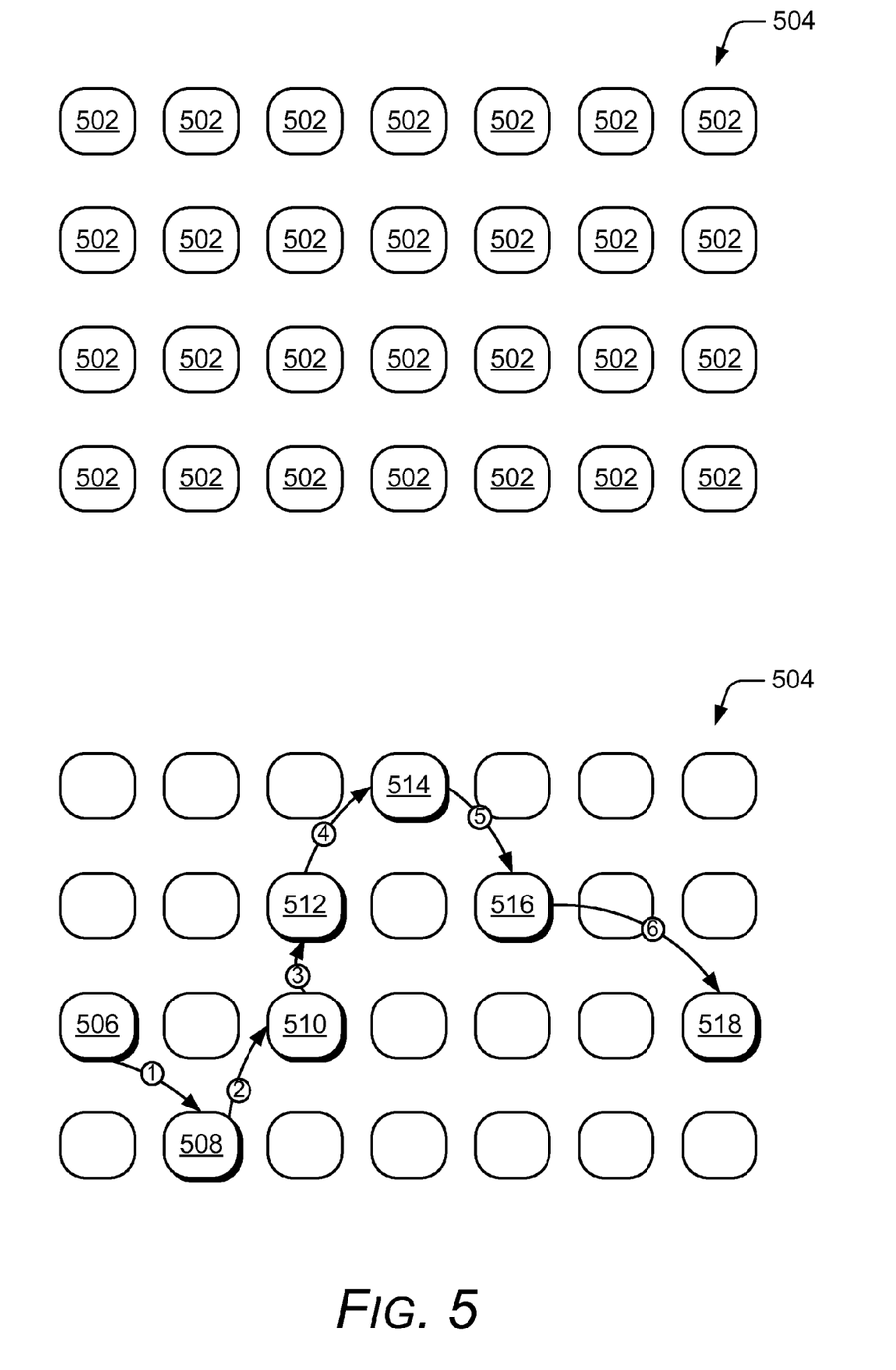
FIG. 5 illustrates an infrastructure having potential intermediate nodes and a required node path determined from the potential intermediate nodes.

At block 402, policy module 206 of FIG. 2 determines a required node path through the 28 potential intermediate nodes 502 of infrastructure 504, such as based on which are trusted or superior. In one example, policy module 206 determines that some of potential intermediate nodes 502 are superior to others based on security robustness levels, existing trust relationships, or security associations, though other factors may also be used. Here policy module 206 determines a required node path through intermediate nodes 506, 508, 510, 512, 514, 516, and 518, along with a corresponding order through which the packet is to be transmitted, namely from 1 to 6.

Block 404 appends a policy to the packet, the policy having the required node path. As noted above, the policy may require each node of the required node path to validate a cryptographic signature of an immediately prior node and cryptographically sign the packet effective to enable the target device or a next node of the required node path to validate the packet.

Block 406 cryptographically signs the packet. The packet may be encrypted in various manners as well, such as encrypting payload data (e.g., sensitive data 208) of the packet at an inner layer of the packet such that the payload data is not capable of being decrypted other than by the target device. The policy, however, may be encrypted at an outer layer of the packet or in-the-clear.

Block 408 causes the packet to be sent through the required node path to the target device. Source node 102 or a trusted and generally first intermediate node, such as intermediate node 108-1 of FIG. 1, can send the packet to the next node of the required node path. In one example case, source node 102 is a mobile network operator, the trusted intermediate node is a subscription manager-data preparation (SM-DP), other intermediate nodes are non-serving subscription managers (SMs), and a last intermediate node is trusted by target device 102 and is a serving subscription manager-secure routing (SM-SR). This is but one example of many cases where the techniques enable secure packet transmission.

Figure 6:
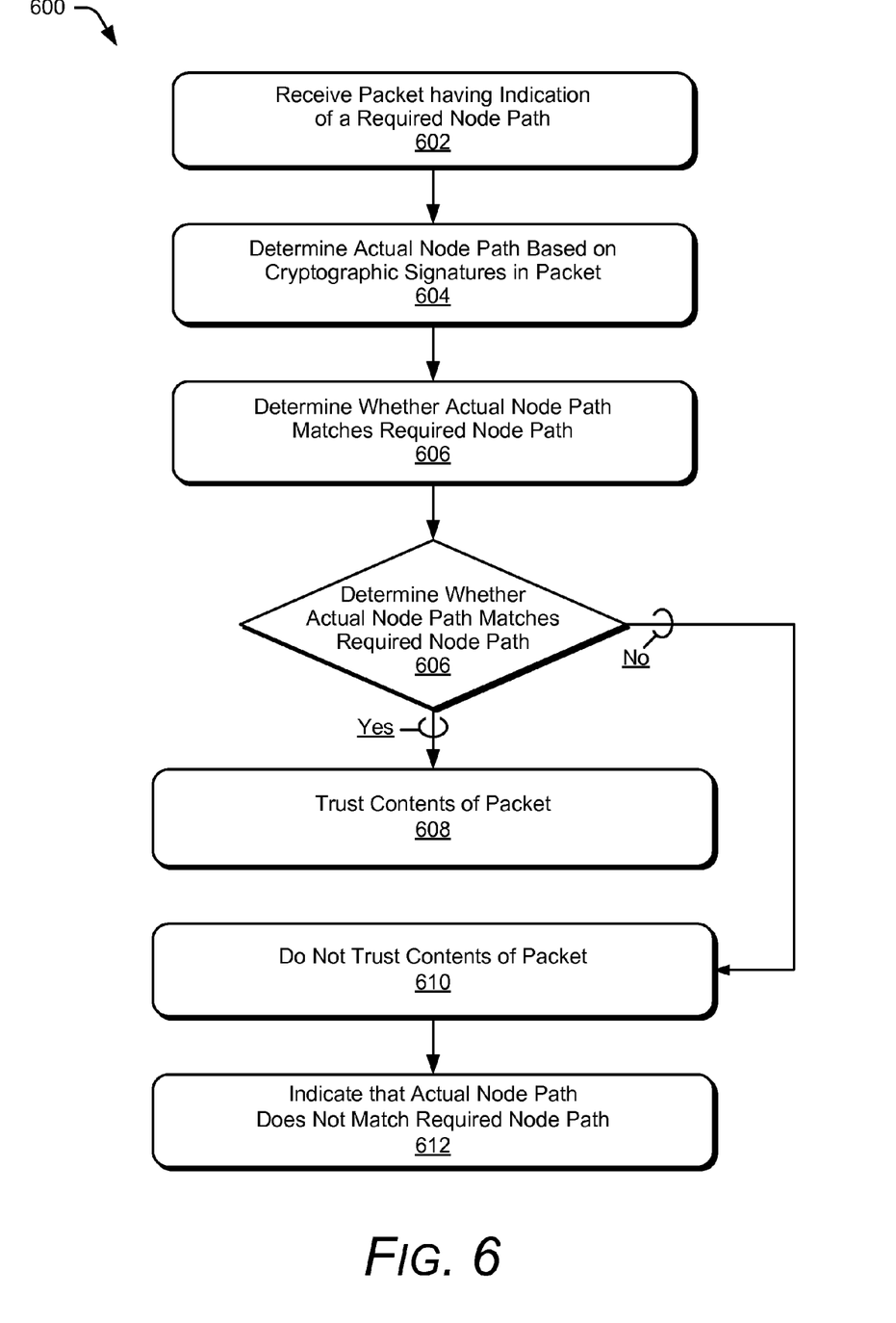
FIG. 6 illustrates example methods for determining whether a policy for secure packet transmission was followed for a packet.

FIG. 6 illustrates example methods 600 for determining whether a policy for secure packet transmission was followed for a packet.

Block 602 receives, at a final node, a packet indicating a required node path of the packet through an infrastructure, the required node path indicating a required source node and one or more required intermediate nodes.

Block 604 determines, based on cryptographic signatures, an actual node path of the packet through the infrastructure, the actual node path indicating an actual source node and one or more actual intermediate nodes.

Block 606 determines whether the actual node path of the packet matches the required node path of the packet. If yes, methods 600 proceed along the "Yes" path to block 608. If no, methods 600 proceed along the "No" path to block 610.

Block 608, responsive to determining that the actual node path matches the required node path, trusts contents of the packet at the final node.

Block 610, responsive to determining that the actual node path does not match the required node path, does not trust contents of the packet at the final node.

Optionally, methods 600 may proceed to block 612 after block 610 or even block 608 (not shown). Block 612 sends the results of block 606 to a remote entity, the results sufficient to indicate that the actual node path matches the required node path or an identity of a node of the actual node path that is not part of the required node path. This identity can show a flaw in an intermediate node, which can allow that intermediate node to be fixed or for loss or failure to be assigned to that node. As some failures can be expensive in resources or lost revenue, this ability to assign accountability for loss can be useful.

Note that methods 600 can be performed by target device 106 or a trusted intermediate node of target device 106, in whole or in part. If methods 600 are performed by policy verifier 306 acting at an intermediate node, such as intermediate node 518 of FIG. 5, for example, that intermediate node can pass packet 112 securely to target device 106, such as with a verifiable indication indicating that the packet is trustworthy. Thus, methods 600 can be performed at target device 106 or an intermediate node trusted by target device 106. In so doing, various components of target device 106 can be operating on this trusted intermediate node, such as policy verifier 306. This is one of the cases in which verifying the required node path does not require a cryptographic signature of each of the intermediate nodes (here intermediate node 518).

Figure 7:
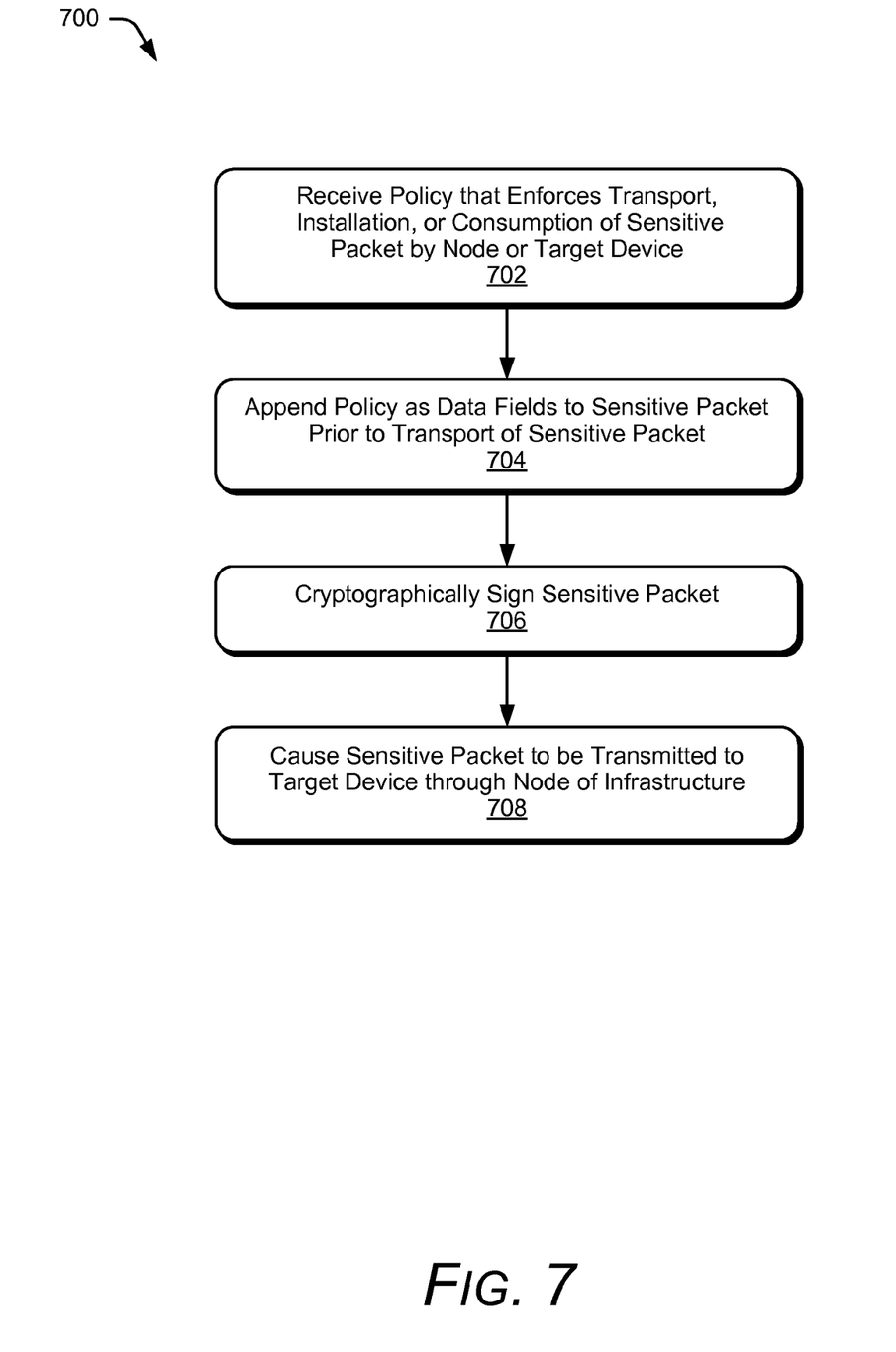
FIG. 7 illustrates example methods for providing end-to-end security for transport of a sensitive packet to a target device through an infrastructure while enforcing a policy.

FIG. 7 illustrates example methods 700 for providing end-to-end security for transport of a sensitive packet to a target device through an infrastructure while enforcing a set of policies regarding at least one of the transport, installation, or consumption of the sensitive packet. Methods 700 are non-limiting, examples of ways in which the techniques may operate.

Methods 700 can be performed by various devices noted herein, such as an initial and trusted node of the infrastructure, an owner of the sensitive packet, a generator of the sensitive packet, or a policy decision point (e.g., source node 102 and trusted intermediate nodes 108-1 of FIGS. 1 and 506 of FIG. 5).

Block 702 receives a policy that enforces transport, installation, or consumption of a sensitive packet by a node of an infrastructure or a target device. In one embodiment, this policy requires each node of the infrastructure through which the sensitive packet is transmitted to check whether an attribute, authorization, or capability of the respective node conforms to the policy, the confirmation required prior to processing the sensitive packet. Examples of these requirements include: decryption of a prior hop-by-hop encryption; cryptographically signing at least a pre-specified part of the sensitive packet; determination of a manner in which to forward the packet to a next node of the infrastructure; updating an appended portion of the sensitive packet to conform to the policy; encrypting the sensitive packet; and/or sending a notification of the processing, such as to a source of the sensitive packet (e.g., source node 102 of FIG. 1).

Further, this policy can require nodes to determine whether each node is itself identified in the policy, and if it is not, to discard the sensitive packet silently, send a notification to an immediately prior node of the required node path, and send another notification to an initial node of the required node path (e.g., source node 102 or intermediate node 108-1 of FIG. 1). If the node determines that it is identified in the policy, the policy may require the node to process the sensitive packet as described in the policy, determine a next node of the required node path based on the list of identifiers, encrypt the sensitive packet for the next node, and update a next-node data field of the data fields. Thus, the techniques can also operate through intermediate nodes, such as to follow the policy at nodes in the infrastructure.

Also, as noted in methods 400 and 600, the policy can be determined, which can also be performed, in some embodiments, by methods 700. The policy received at block 702 can be determined based on nodes of the infrastructure having an ability to follow a specific certification process or a specific security robustness level, as specified above, as well as other factors.

Block 704 appends the policy as data fields of the sensitive packet prior to transport of the sensitive packet. These data fields, and thus the policy itself, can include a profile type, a profile owner identifier (e.g., a source node), a profile security robustness level, a profile policy feature vector, profile path information, or routing information of at least a next node of the infrastructure using an identifier or a flag.

Block 706 cryptographically signs the sensitive packet. This signing can be performed by various entities as noted above, such as by a sender of the sensitive packet or a generator of the sensitive packet.

In some cases the sensitive packet is encrypted at various levels (inner, outer, etc.) as noted above. The sensitive packet can be encrypted for end-to-end confidentiality protection between the target device and an initial node of the infrastructure through which the sensitive packet is initially transported, for example. This end-to-end confidentiality protection can be an inner layer encryption as noted above, which can be performed prior to outer layer encryption (e.g., hop-by-hop encryption). Some data of the sensitive packet can be in-the-clear. Fields that are in-the-clear may include a next node identifier, a flag, an outer-layer policy rule, a flag, or an identifier of the target device.

Block 708 causes the sensitive packet to be transmitted to the target device through at least one node of the infrastructure. As noted herein, each node through which the sensitive packet is transmitted, as well as the target device or a last and trusted intermediate node, can operate according to the policy appended to data fields of the sensitive packet. By so doing, the sensitive packet can be transmitted securely from the source node to the target device.

As noted, methods 700 cause the sensitive packet to be transmitted to the target device. This target device, or a trusted (and last) intermediate node, can be required by the policy to perform operations (some as noted for methods 600 above). These operations can include verifying that the nodes through which the sensitive packet was transmitted match the policy. Then, the policy can require that a result be sent of the verification to a sender of the sensitive packet, that the result be recorded, that the sensitive packet be recorded, and that the sensitive packet be forwarded to the target device after successful processing or discarded after unsuccessful processing. Alternatively or additionally, the policy can require that, after verification, the target device or a trusted intermediate node attempt to process the sensitive packet locally and, if not successful, discard the sensitive packet and send an acknowledgment indicating that the processing is not successful.

Figure 8:
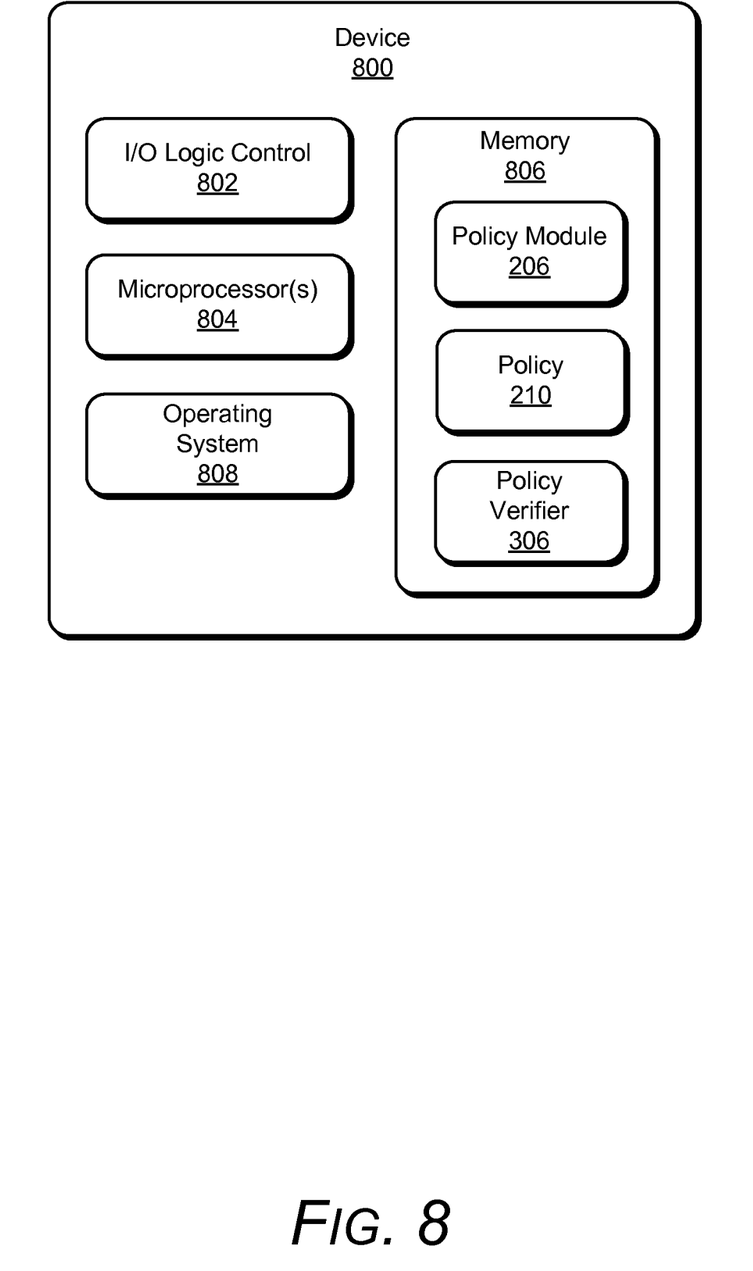
FIG. 8 illustrates various components of an example device that can implement techniques enabling a policy for secure packet transmission and verification of that policy.

FIG. 8 illustrates various components of an example device 800 including policy module 206, policy 210, and/or policy verifier 306. These components can be implemented in hardware, firmware, and/or software and as described with reference to any of the previous FIGS. 1-7, including a System-on-Chip (SoC).

Example Device

Example device 800 can be implemented in a fixed or mobile device being one or a combination of a media device, computing device (e.g., source node 102, intermediate nodes 108, and/or target device 106 of FIG. 1), television set-top box, video processing and/or rendering device, appliance device (e.g., a closed-and-sealed computing resource, such as some digital video recorders or global-positioning-satellite devices), gaming device, electronic device, vehicle, and/or workstation.

Example device 800 can be integrated with electronic circuitry, a microprocessor, memory, input-output (I/O) logic control, communication interfaces and components, other hardware, firmware, and/or software needed to run an entire device. Example device 800 can also include an integrated data bus (not shown) that couples the various components of the computing device for data communication between the components.

Example device 800 includes various components such as an input-output (I/O) logic control 802 (e.g., to include electronic circuitry) and microprocessor(s) 804 (e.g., microcontroller or digital signal processor). Example device 800 also includes a memory 806, which can be any type of random access memory (RAM), a low-latency nonvolatile memory (e.g., flash memory), read only memory (ROM), and/or other suitable electronic data storage. Memory 806 includes or has access to policy module 206, policy 210, and/or policy verifier 306.

Example device 800 can also include various firmware and/or software, such as an operating system 808, which, along with other components, can be computer-executable instructions maintained by memory 806 and executed by microprocessor 804. Example device 800 can also include other various communication interfaces and components, wireless LAN (WLAN) or wireless PAN (WPAN) components, other hardware, firmware, and/or software.

Other example capabilities and functions of these modules and components are described with reference to components shown in FIGS. 1, 2, and 3. These modules and components, either independently or in combination with other modules or components, can be implemented as computer-executable instructions maintained by memory 806 and executed by microprocessor 804 to implement various embodiments and/or features described herein. Alternatively or additionally, any or all of these components can be implemented as hardware, firmware, fixed logic circuitry, or any combination thereof that is implemented in connection with the I/O logic control 802 and/or other signal processing and control circuits of example device 800. Furthermore, some of these components may act separate from device 800.

Although the invention has been described in language specific to structural features and/or methodological acts, it is to be understood that the invention defined in the appended claims is not necessarily limited to the specific features or acts described. Rather, the specific features and acts are disclosed as example forms of implementing the claimed invention.

What is claimed is:

1. A method for providing end-to-end security for transport of a sensitive packet to a target device through an infrastructure based on a policy, the method comprising:
   receiving the policy, the policy enforcing at least one of a transport, an installation, or a consumption of the sensitive packet by the target device or a node of the infrastructure through which the sensitive packet is intended to be transported;
   appending the policy as data fields of the sensitive packet prior to transport of the sensitive packet, wherein the sensitive packed is encrypted for end-to-end confidentiality protection between the target device and an initial node of the infrastructure through which the sensitive packet is initially transported;
   cryptographically signing the sensitive packet; and
   causing the sensitive packet to be transmitted to the target device through at least the node of the infrastructure, wherein the sensitive packet is encrypted for end-to-end confidentiality protection between the target device and an initial node of the infrastructure through which the sensitive packet is initially transported and the encryption for end-to-end confidentiality protection is an end-to-end inner layer encryption and is performed prior to a hop-by-hop encryption.

2. A method as recited in claim 1, wherein the policy requires each node of the infrastructure through which the sensitive packet is transmitted to check whether an attribute, authorization, or capability of the respective node conforms to the policy prior to processing the sensitive packet.

3. A method as recited in claim 2, wherein processing the sensitive packet includes: decrypting a prior hop-by-hop encryption; cryptographically signing at least a pre-specified part of the sensitive packet; determining a manner in which to forward the packet to a next node of the infrastructure; updating an appended portion of the sensitive packet to conform to the policy; and encrypting the sensitive packet.

4. A method as recited in claim 2, wherein processing the sensitive packet includes sending a notification of results of the processing the sensitive packet to a source or owner of the sensitive packet.

5. A method as recited in claim 1, wherein cryptographically signing the sensitive packet is performed by an intermediate node of the infrastructure.

6. A method as recited in claim 1, wherein the method is performed by an owner of the sensitive packet, a generator of the sensitive packet, or a policy decision point.

7. A method as recited in claim 1, further comprising determining the policy based on nodes of the infrastructure having an ability to follow a specific certification process or a specific security robustness level.

8. A method as recited in claim 1, wherein the data fields in which the policy is appended to the sensitive packet include a profile type, a profile owner identifier, a profile security robustness level, a profile policy feature vector, a profile path information, or a routing information in a form of at least a next node of the infrastructure's identifier or a flag.

9. A method as recited in claim 8, wherein the profile path information includes a required node path of nodes within the infrastructure, the required node path formatted as a list of identifiers identifying the nodes within the infrastructure.

10. A method as recited in claim 9, wherein the identifiers identifying the nodes include an IP address or a fully qualified domain name (FQDN).

11. A method as recited in claim 9, wherein the required node path is determined based on an existing trust relationship, a security association, or a capability to handle a security robustness level.

12. A method as recited in claim 9, wherein the policy requires each node of the required node path to determine whether each node's own identifier is in the list of identifiers and if the node's own identifier is determined not be in the list of identifiers, discard the sensitive packet silently, send a first notification to an immediately prior node of the required node path, and send a second notification to an initial node of the required node path.

13. A method as recited in claim 9, wherein the policy requires each node of the required node path to determine whether each node's own identifier is in the list of identifiers and if the node's own identifier is determined to be in the list of identifiers: process the sensitive packet as described in the policy; determine a next node of the required node path based on the list of identifiers; encrypt the sensitive packet for the next node; and update a next-node data field of the data fields.

14. A method as recited in claim 1, wherein the policy requires a required node path through the infrastructure and for each node of the required node path to cryptographically sign a prescribed part of the sensitive packet responsive to determining that the node is identified is in the required node path.

15. A method as recited in claim 1, wherein the policy requires a required node path through the infrastructure and that a final node of the required node path verify other nodes of the required node path.

16. A method as recited in claim 15, wherein the policy requires the final node of the required node path, responsive to verifying the other nodes of the required node path, to send a result of the verification to a sender of the sensitive packet, record the result, record the sensitive packet, and forward the sensitive packet to the target device after successful processing or discard the sensitive packet after unsuccessful processing.

17. A method as recited in claim 15, wherein the policy requires the final node of the required node path, responsive to verifying the other nodes of the required node path, to attempt to process the sensitive packet locally and, if not successful, discard the sensitive packet and send an acknowledgment indicating that the processing is not successful.

18. A method as recited in claim 1, wherein one or more of the data fields in which the policy is appended to the sensitive packet are in the clear, the in-the-clear data fields including a next node identifier, a flag, an outer-layer policy rule, a flag, or an identifier of the target device.

19. A method for providing end-to-end security for transport of a sensitive packet to a target device through an infrastructure based on a policy, the method comprising:
receiving the policy, the policy enforcing at least one of a transport, an installation, or a consumption of the sensitive packet by the target device or a node of the infrastructure through which the sensitive packet is intended to be transported, wherein:
the policy requires each node of the infrastructure through which the sensitive packet is transmitted to check whether an attribute, authorization, or capability of the respective node conforms to the policy prior to processing the sensitive packet, and
processing the sensitive packet includes:
decrypting a prior hop-by-hop encryption;
cryptographically signing at least a pre-specified part of the sensitive packet;
determining a manner in which to forward the packet to a next node of the infrastructure;
updating an appended portion of the sensitive packet to conform to the policy; and
encrypting the sensitive packet;
appending the policy as data fields of the sensitive packet prior to transport of the sensitive packet;
cryptographically signing the sensitive packet; and
causing the sensitive packet to be transmitted to the target device through at least the node of the infrastructure.

20. A method as recited in claim 19, wherein cryptographically signing the sensitive packet is performed by an intermediate node of the infrastructure.

21. A method as recited in claim 19, further comprising determining the policy based on nodes of the infrastructure having an ability to follow a specific certification process or a specific security robustness level.

22. A method as recited in claim 19, wherein the data fields in which the policy is appended to the sensitive packet include a profile type, a profile owner identifier, a profile security robustness level, a profile policy feature vector, a profile path information, or a routing information in a form of at least a next node of the infrastructure's identifier or a flag.

23. A method as recited in claim 22, wherein the profile path information includes a required node path of nodes within the infrastructure, the required node path formatted as a list of identifiers identifying the nodes within the infrastructure.

24. A method as recited in claim 23, wherein the identifiers identifying the nodes include an IP address or a fully qualified domain name (FQDN).

25. A method as recited in claim 23, wherein the required node path is determined based on an existing trust relationship, a security association, or a capability to handle a security robustness level.

26. A method as recited in claim 23, wherein the policy requires each node of the required node path to determine whether each node's own identifier is in the list of identifiers and if the node's own identifier is determined not be in the list of identifiers, discard the sensitive packet silently, send a first notification to an immediately prior node of the required node path, and send a second notification to an initial node of the required node path.

27. A method as recited in claim 23, wherein the policy requires each node of the required node path to determine whether each node's own identifier is in the list of identifiers and if the node's own identifier is determined to be in the list of identifiers: process the sensitive packet as described in the policy; determine a next node of the required node path based on the list of identifiers; encrypt the sensitive packet for the next node; and update a next-node data field of the data fields.

28. A method as recited in claim 19, wherein the policy requires a required node path through the infrastructure and for each node of the required node path to cryptographically sign a prescribed part of the sensitive packet responsive to determining that the node is identified is in the required node path.

29. A method as recited in claim 1, wherein the policy requires a required node path through the infrastructure and that a final node of the required node path verify other nodes of the required node path.

30. A method as recited in claim 29, wherein the policy requires the final node of the required node path, responsive to verifying the other nodes of the required node path, to send a result of the verification to a sender of the sensitive packet, record the result, record the sensitive packet, and forward the sensitive packet to the target device after successful processing or discard the sensitive packet after unsuccessful processing.

31. A method as recited in claim 29, wherein the policy requires the final node of the required node path, responsive to verifying the other nodes of the required node path, to attempt to process the sensitive packet locally and, if not successful, discard the sensitive packet and send an acknowledgment indicating that the processing is not successful.

32. A method as recited in claim 19, wherein one or more of the data fields in which the policy is appended to the sensitive packet are in the clear, the in-the-clear data fields including a next node identifier, a flag, an outer-layer policy rule, a flag, or an identifier of the target device.

* * * * *